3,443,359
METHOD FOR SEPARATING A MIXTURE OF ORGANIC COMPOUNDS
Marco Taramasso, San Donato Milanese, and Luigi Zerilli, Milan, Italy, assignors to Snam Progetti S.p.A., Milan, Italy, a company of Italy
Filed Apr. 18, 1966, Ser. No. 543,285
Claims priority, application Italy, Apr. 23, 1965, 3,864/65
Int. Cl. B01d *53/02, 15/08*
U.S. Cl. 55—67                                       3 Claims

ABSTRACT OF THE DISCLOSURE

For gas chromotography a material is used comprising a support, and a halide bound to said support by a cationic or anionic connection, said support being selected from the group consisting of kaolinite, halloysite, sepiolite, attapulgite, vermiculite, chlorite, and graphite which has been subjected to oxidation, and said halide being selected from the group consisting of dimethyloctadecylammonium, trimethyloctadecylammonium, and trimethyloctylammonium halides.

---

Figure 2:
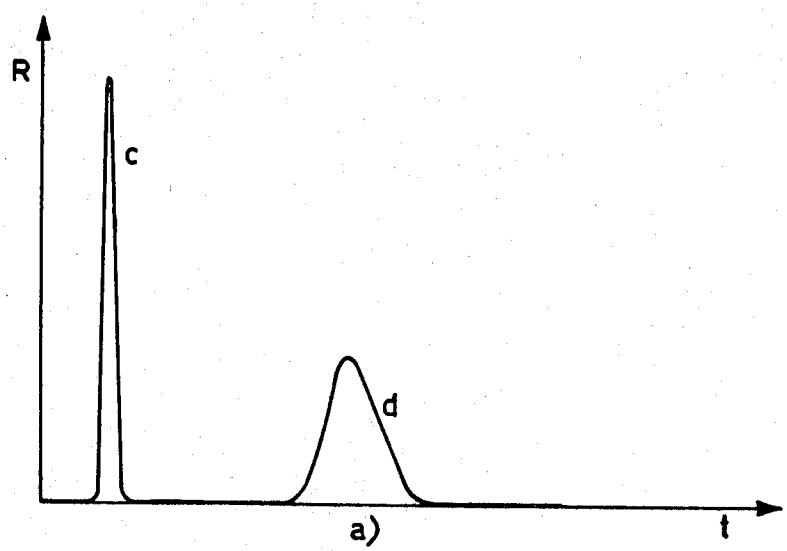

Our invention has for its object novel compounds which may be advantageously used in physical and physico-chemical methods of separation of organic compounds and it also covers separating methods resorting to such compounds. More particularly, our invention relates to the preparation of compounds to be used as adsorbents in adsorbing methods, both on stationary and on movable beds and also as stationary phases in gas chromatographic methods.

It is a well-known fact that separations in vapor phase and in liquid phase resort generally to adsorbent substances such as silica gel, active carbon, to molecular sieves and the like. In particular, it is also known that the compounds just referred to show, when used for chromatographic purposes, adsorption isotherms which are not linear.

It is furthermore known that for gas chromatographic purposes substances suitable for the separation and which are termed "distributing liquids" provide linear isotherms.

Now, we have found that it is possible to produce the separation between organic compounds, which are otherwise separated only with difficulty, through physical or physico-chemical means, and more specifically through adsorbing methods, or else through gas chromatographic methods, by resorting to the use of special compounds.

Such compounds adapted for use in accordance with our invention are, generally speaking, constituted by at least two components. One of these which we will define conventionally hereinafter as an active support which may be inorganic or organic, should be provided with a crystalline network, that is, a crystal lattice, or electrical charges, which are not saturated or satisfied, and/or functional groups including active hydrogen atoms so as to hold fast in a stable manner the other component which will be termed hereinafter the "anchored component" carrying cations or anions and/or functional groups bonded to a hydrocarbon chain. Logically, the support may actually include electrical charges or loads which are not balanced or satisfied and/or functional groups but the latter may also be introduced into the support through means provided by present-day technique for this purpose.

Said support should show a granulometric structure ranging between 40 and 200 U.S. mesh with a particle size which is not lower than 40 microns, while the surface area does not rise above 50 square meters per gramme and it should not show a tubular microporous structure. The second component which is assumed, as already mentioned, to be anchored to the support through a cationic or anionic connection should be distributed over the outer surface of said support.

The hydrocarbon chain may also include functional groups and preferably it should include between 12 and 18 atoms of carbon. We can use advantageously as a support for instance attapulgite, sepiolite, kaolinite, halloysite, chlorite, vermiculite, graphitic oxide, that is, graphite which has been subjected to oxidation, and the like. These are all solids. It is of particular advantage to use for certain separations suitably treated vermiculite. Vermiculite is a mineral substance of the silico-aluminate family having a lamellary structure incorporating non-balanced or unsatisfied electrical charges, chiefly through substitution of $Al^{3+}$ for $Si^{4+}$.

It is possible to anchor in said support a hydrocarbon chain through a technique which is known per se.

The novel compounds thus obtained when used as stationary phases for chromatographic purposes show linear adsorption isotherms of the same type as those obtained with distributing liquids.

Our novel compounds show furthermore numerous advantages and inter alia that of supplying the same saparations which may be obtained for instance with the sole ionic part contained therein when used as a distributing liquid alone and furthermore, whenever said part is anchored in a regular structure, they supply a specific selectivity which cannot be obtained with the two parts, to wit the support and the ionic part, when used separately.

A further advantage of said compounds consists in that, being anchored permanently in the support, the amount of organic phase although it is high remains constant since the gas conveyor cannot remove it from the support.

This allows cutting out the losses, while on the other hand, it is impossible to soil the separated fractions. The compounds according to the present invention are particularly efficient for the separation of paraffinic derivatives and of cycloparaffinic derivatives from aromatics and furthermore they are selective of the meta and para isomers derived from aromatic compounds.

In certain cases, it may be of advantage to resort as a stationary phase for gas chromatographic methods, to mixtures of said compounds with other conventional substances such as dinonyle phthalate, dioctyle sebacate, silicone oils and the like.

Thus, the advantages of our novel compounds have been shown clearly in particular when used for gas chromatographic purposes and it is obvious that such advantages appear also when said compounds are used for various separating procedures. At any rate our invention should not be construed as limited to one particular standpoint.

Figure 1:
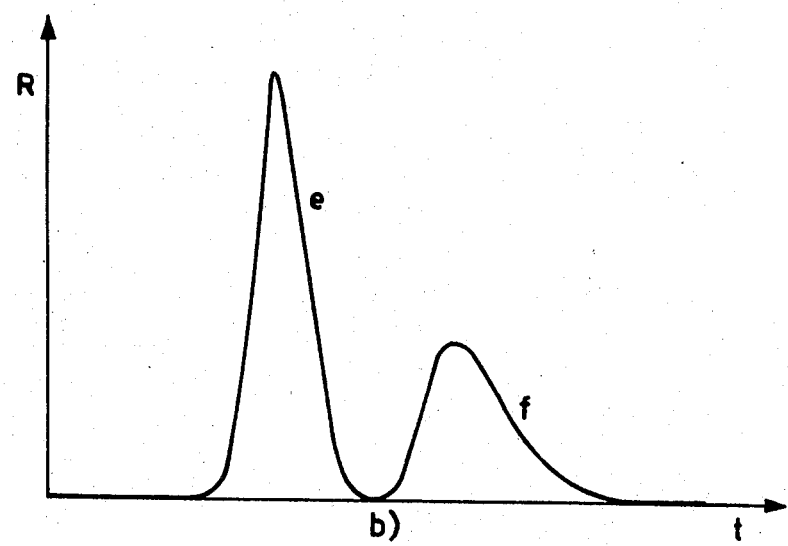

FIG. 1 is a chromatogram relating to the separation of m-xylenol and p-xylenol; and FIG. 2 is a chromatogram showing the separation between m-dichlorobenzene and p-dichlorobenzene.

Following are examples to further the understanding of the invention.

Example 1

A commercial attapulgite devoid of any other mineral matter as shown by X-ray analysis has been sifted in a wet condition; and a fraction, constituted by particles ranging between 200 and 325 U.S. mesh (that is between 74 and 44 microns), has been removed with a cation exchange equal to at least 30 meq. per 100 grammes.

This fraction is then treated with an amount slightly in excess of stoichiometric proportions of a salt of quaternary ammonium (such as dimethyldioctadecylammonium chloride or trimethylcetylammounium bromide) forming a suspension in water in the proportion of 20 grs. per litre. This mixture is heated up to 50° C. while being stirred after which there is slowly added a solution of 0.01 M of the ammonium salt. When this addition is at an end, the mixture is kept at a temperature of 50° C. and is stirred for a further hour. It is then filtered and washed until the halogen has been entirely removed into the washing water; and lastly it is dried at a temperature of 150° C. in a stream of nitrogen during 4 to 5 hours.

The compound just prepared is furthermore treated with a modifying substance such as octyl sebacate at the rate of 10% with reference to the treated attapulgite.

The selectivity of the absorbent has been checked by a filling column for gas chromatography of a length equal to 1.8 m. with an inner diameter of 6 millimeters; the absorbent being sprayed on a fire brick of a C 22 60–80 mesh in amounts equal to 15% by weight, the separation coefficients being then deduced (ratio between the durations of reaction, corrected for the idle intervals).

| Separation | Separation coefficient | Temperature, (° C.) |
|---|---|---|
| Benzene/cyclohexane | 2.2 | 60 |
| m-Xylenol/p-xylenol | 1.29 | 72 |

There is always found a well-defined symmetry between the peaks and short durations of reaction.

Example 2

Sepiolite, separated through settling from quartz-containing residual matter, and which has been shown to be pure through an analysis by X-rays, and which provides furthermore a cationic exchange of 18 meq. per 100 grammes, has been treated in the same manner as disclosed in Example 1 with dimethyldioctadecylammonium chloride.

The execution of a chromatographic examination has given the following results:

Separation _____ m-xylenol/p-xylenol
Separation coefficient _____ 1.1
Temperature _____ 50° C.

The comparatively low value of the separation coefficient obtained with sepiolite supports as compared with the coefficient according to Example 1 shows how the nature of the support can act on the selectivity to a substantial extent.

Example 3

Flakes of vermiculite are crushed and screened down to the desired granulometric conditions which means not less than 325 mesh with a cationic exchange which is not less than 100 meq./100 grammes. Said flakes of vermiculite were treated as disclosed in the preceding example; and the ammonium salt selected was the chloride of dimethyldioctadecylammonium and is removed with the modifying agent.

For obtaining the desired chromatographic values, it is possible to introduce directly into the column particles of a granulometric size ranging between 40 and 120 U.S. mesh which means that it is not necessary to susupend them on fire bricks. Particles under 200 U.S. mesh are dispersed on fire bricks.

The values obtained are:

| Separation | Separation coefficient | Temperature, (° C.) |
|---|---|---|
| Benzene/cyclohexane | 8.5 | 60 |
| m-Xylenol/p-xylenol | 1.82 | 90 |
| m-Dichlorobenzene/p-dichlorobenzene | 5.6 | 150 |

In FIGS. 1 and 2, the axis of ordinates shows the response of the detecting agent R, in the case considered the modification in heat conductivity, while the abscissae show the time $t$.

The peak designated at $c$ in FIG. 2 corresponds to the separation of p-dichlorobenzene while $d$ designates the separation of m-dichlorobenzene on curve $a$. Similarly $e$ in FIG. 1 corresponds to the separation of the p-xylenol and $f$ to that of its m-isomer on curve $b$.

The granulometric values ranging between 40 and 120 U.S. mesh used directly as a filler for the chromatographic columns show the advantage of adding a high absorbing capacity and consequently they provide for separation on a preliminary scale.

We claim:
1. A method for separating a mixture of organic compounds, comprising flowing the mixture through a chromatographic column packed with a crystalline support selected from the group consisting of sepiolite, attapulgite, and vermiculite, the surface of said support having bonded thereon an ion selected from the group consisting of dimethyloctadecylammonium, trimethyloctadecylammonium, and trimethyloctylammonium.

2. A method as claimed in claim 1, wherein the support consists of particles having a granulometric value ranging between 40 and 200 U.S. mesh, the size of which is not less than 40 microns.

3. A method as claimed in claim 1, wherein the surface area of the support is not greater than 50 square meters per gramme.

References Cited

M. A. Hughes, et al., "Separation of the Meta and Para Isomers of the Xylenes, Cresols, and Toluidines by Gas-Solid Chromatography," Nature, 184 (4701), 1796–1797 (1959).

J. L. DE CESARE, *Primary Examiner.*